(No Model.)
2 Sheets—Sheet 1.
G. W. NÜTZ,
DENTAL ENGINE.
No. 451,277.  Patented Apr. 28, 1891.
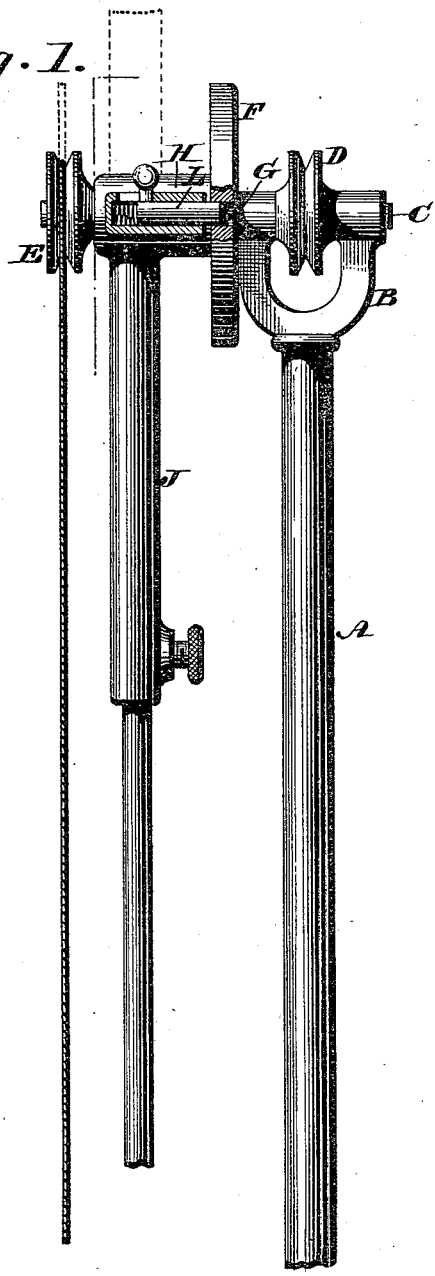
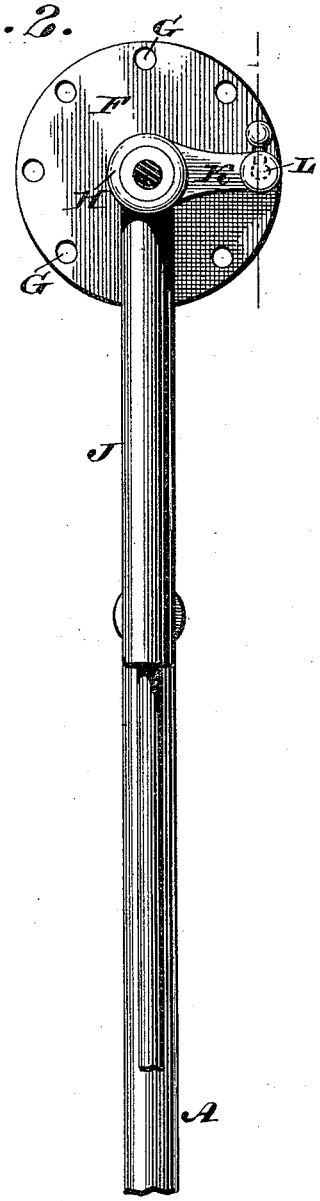

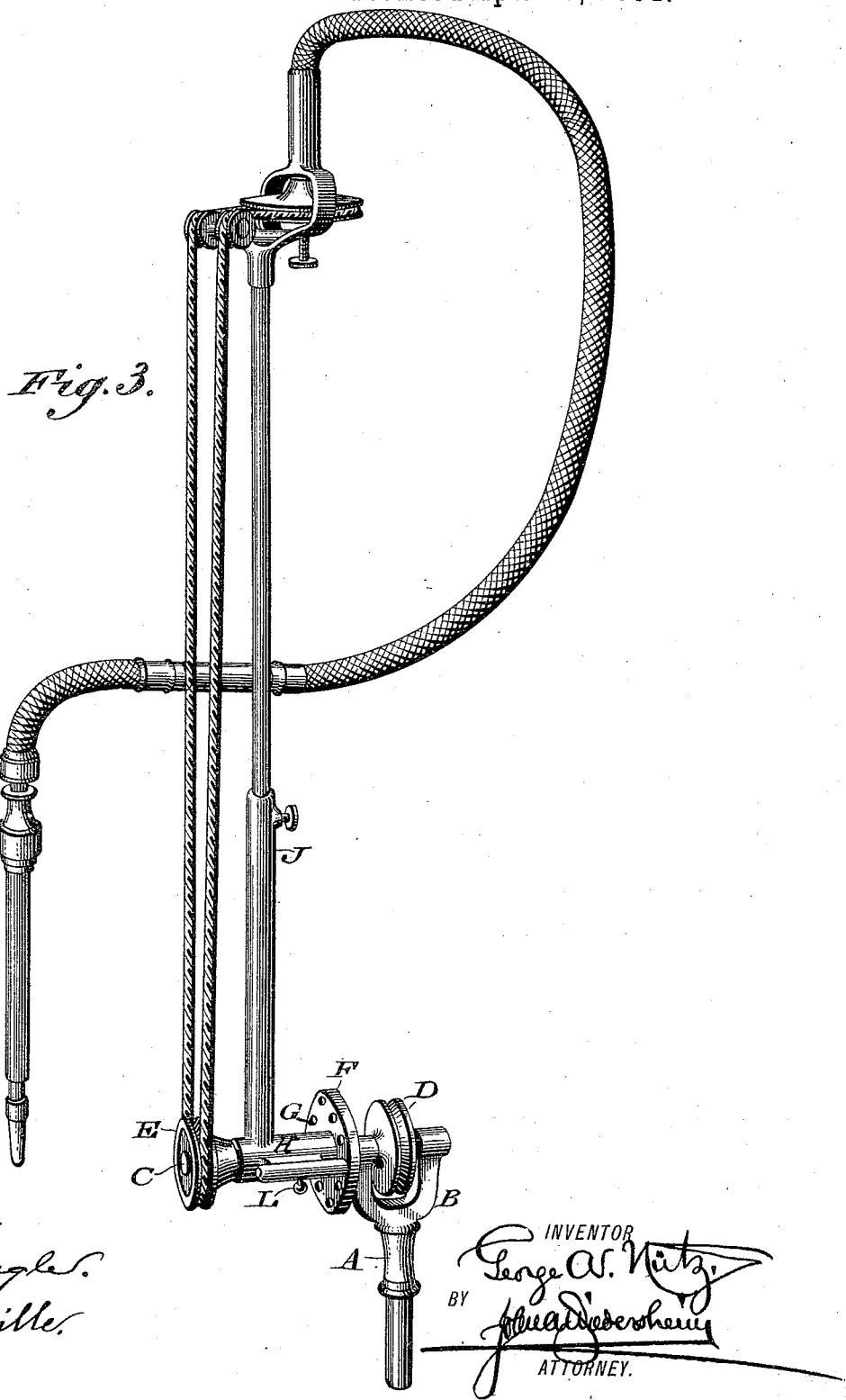

UNITED STATES PATENT OFFICE.

GEORGE W. NÜTZ, OF PHILADELPHIA, PENNSYLVANIA, ASSIGNOR TO HENRY D. JUSTI, OF SAME PLACE.

DENTAL ENGINE.

SPECIFICATION forming part of Letters Patent No. 451,277, dated April 28, 1891.

Application filed September 18, 1890. Serial No. 365,383. (No model.)

*To all whom it may concern:*

Be it known that I, GEORGE W. NÜTZ, a citizen of the United States, residing in the city and county of Philadelphia, State of Pennsylvania, have invented a new and useful Improvement in Dental Engines, which improvement is fully set forth in the following specification and accompanying drawings.

My invention relates to improvements in dental engines; and it consists, first, of a novel extensible arm for carrying the tool-holder, substantially as described; second, of a novel clamping device for the arm carrying the tool-holder shaft-bearings, substantially as described; third, of the combination of parts hereinafter set forth.

Figure 1 represents a partial side and partial sectional view of a portion of a dental engine embodying my invention. Fig. 2 represents an end view of the same. Fig. 3 represents a perspective view of a dental engine embodying my invention.

Similar letters of reference indicate corresponding parts in the several figures.

Referring to the drawings, A designates a standard of a dental engine, in the head B of which is journaled the shaft C, the latter having the pulley D thereon to transmit motion to the same, and the pulley E to communicate motion from the said shaft to other portions of the device. Connected with the head B is a disk F, having near its rim a series of openings G, and loosely mounted on the shaft C of said head is a sleeve or boss H, which latter has secured to it the arms J and K. The arm J is extensible and adapted to have secured to it the bearing for a shaft rotating the tool, said bearing and shaft, however, being old and well known and forming *per se* no part of this invention. A further description of the same in connection herewith is deemed unnecessary. Their relation, however, to the other parts of the engine is clearly shown in Fig. 3. The arm or part K of the sleeve has a bolt or latch L fitted to it, the same being adapted to enter either of the openings G, so as to retain the sleeve H in place.

It will be seen that when it is required to raise or otherwise adjust the arm J and connected mechanism the bolt is drawn out and the adjustment made, after which the bolt is shot into the proper opening of disk F, when the parts are held in desired position.

Having thus described my invention, what I claim as new, and desire to secure by Letters Patent, is—

1. In a dental engine, a standard having secured thereto a disk or plate with a series of openings therein, a rotary shaft journaled in said standard, a sleeve rotatably mounted on said shaft and provided with an arm, and a bolt connected with said sleeve and adapted to enter either one of said series of openings, said parts being combined substantially as described.

2. In a dental engine, a standard with a shaft journaled therein and provided with a disk or plate having openings therein, a rotatable sleeve on said shaft having an extensible arm and a bolt, the latter adapted to enter any of said openings, said parts being combined substantially as described.

GEORGE W. NÜTZ.

Witnesses:
JOHN A. WIEDERSHEIM,
WM. C. WIEDERSHEIM.